United States Patent Office 3,391,225
Patented July 2, 1968

3,391,225
GRAFT POLYMERS OF CHLORINATED BUTYL RUBBER ON POLYVINYL CHLORIDE AND PROCESS FOR PREPARATION OF SAME
Jean Claude Thomas and Michel Marbach, Lyon, France, assignors to Produits Chimiques Pechiney-Saint-Gobain, Neuilly-sur-Seine, France
No Drawing. Filed Nov. 24, 1964, Ser. No. 413,612
Claims priority, application France, Dec. 3, 1963, 955,854
10 Claims. (Cl. 260—879)

ABSTRACT OF THE DISCLOSURE

The preparation of graft polymers of vinyl chloride-chlorinated butyl rubber by bulk polymerization in the presence of a catalyst of vinyl chloride-chlorinated butyl rubber in which the latter is present in an amount within the range of 1–30% by weight of the graft polymer.

This invention relates to graft polymers of vinyl chloride.

It is known to prepare polymers of vinyl chloride having improved impact strength by polymerization in suspension or emulsion in the presence of polymers such as polybutadiene, tridecyl polyacrylate, and the like. However, such polymers are subject to heat distortions at temperatures below normal polyvinyl chloride and they are also subject to rapid aging.

It is an object of this invention to produce and to provide a method for producing graft polymers of vinyl chloride which are not subject to the drawbacks heretofore described, which are characterized by high impact strength, and which have satisfactory heat distortion characteristics.

The objects of this invention are achieved by the process of catalytic bulk polymerization of vinyl chloride in the presence of chlorinated butyl rubber whereby chlorinated butyl rubber becomes grafted onto the chain of the vinyl chloride polymer.

Chlorinated butyl rubber is a copolymer obtained by the reaction of an isoolefin, such as isobutylene, with a conjugated diolefin, such as isoprene, and by chlorination of the copolymer that is formed. The chlorinated butyl rubber is soluble in the vinyl chloride monomer and is, therefore, easy to graft onto the vinyl chloride chain during its polymerization. Unchlorinated butyl rubbers, under the same working conditions, result in a mixture with the polyvinyl chloride resin to give a product having an impact strength which is greater than that of polyvinyl chloride but less than the graft polymer of this invention.

The impact strength of graft polymers of vinyl chloride, prepared in accordance with the practice of this invention, has been found to increase with an increase in the amount of chlorinated butyl rubber grafted on the polymer chain. In practice, it is desirable to maintain the amount of grafted chlorinated butyl rubber to within the range of 1–30% by weight of the graft polymer and preferably in an amount within the range of 5–15% by weight.

The improvement of this invention is achieved when the reaction of polymerization and grafting are carried out simultaneously in bulk. When the reaction is carried out in emulsion or suspension, the desired grafting is not effected. Instead, a simple mixture of polyvinyl chloride and chlorinated butyl rubber is secured which gives a product having impact strengths greater than polyvinyl chloride but markedly lower than the same graft polymer when the same quantity of chlorinated butyl rubber is present.

After dissolving chlorinated butyl rubber in vinyl chloride, the reaction is carried out in the conventional manner for bulk polymerization by heating at the temperature and pressure corresponding to the K-value (Fikentscher—Cellulose Chemie, 1932, t 13) which it is desired to obtain, the impact strength increasing with the K-value of the graft polymer of vinyl chloride.

As the catalyst component, use can be made of the conventional catalysts used for polymerization of vinyl chloride, such as organic peroxides, organic peroxydicarbonates, azonitriles, and the like, in amounts normally employed for vinyl chloride polymerization. The catalyst may be introduced at any time but it is preferably introduced simultaneously with the addition of the chlorinated butyl rubber or after the chlorinated butyl rubber has been dissolved in the vinyl chloride monomer.

The polymer of vinyl chloride having the chlorinated butyl rubber grafted thereon is in the form of a white powder. When dissolved in tetrahydrofurane, it precipitates only partially in response to the addition of transdichloroethylene. On the other hand, a solution of a mixture of polyvinyl chloride and chlorinated butyl rubber will precipitate the polyvinyl chloride completely in response to the addition of transdichloroethylene.

Chlorinated butyl rubber can be distinguished from other rubbers in that chlorinated butyl rubber does not age so that the graft polymer of this invention retains its impact strength over a very long period of time. Further, chlorinated butyl rubber is non-toxic and, therefore, can be allowed to come into contact with foodstuffs such that the graft polymer of this invention will find numerous applications in packaging of such materials as foodstuffs, pharmaceuticals, and the like.

The following examples are given by way of illustration, but not by way of limitation, of the invention:

Example 1

In an upright stainless steel autoclave having a capacity of 100 liters and provided with an agitator, there is introduced 35 kg. of vinyl chloride and 2 kg. of chlorinated butyl rubber (Enjay Butyl HT 10-66—Standard Oil of New Jersey). The materials are heated to 52° C. for one hour to dissolve the chlorinated butyl rubber in the vinyl chloride monomer. Isopropyl peroxydicarbonate is introduced as a catalyst in an amount to provide 0.0033% of active oxygen based upon the weight of vinyl chloride. The reaction is carried out at 52° C. and at a pressure of 7.5 kg./cm.$^2$ for 16 hours. Unreacted vinyl chloride is removed by volatilization and the formed graft polymer containing 8% by weight of chlorinated butyl rubber is obtained in a yield of 65.7% based upon the weight of vinyl chloride.

A part of the obtained polymer is dissolved in tetrahydrofurane and only a slight precipitation of vinyl chloride is observed upon the addition of trans-dichloroethylene which is indicative of grafting. The graft polymer has a density of 0.38.

The graft polymer is worked at 160° C. for 10 minutes in a cylindrical mixer and calcium stearate in an amount corresponding to 1.2%| by weight of the polymer and glycerine in an amount corresponding to 1.2% by weight of the polymer are added. The obtained material is pressed for 18 minutes at a temperature of 170° C. into platens formed with cavities to provide test specimens having a length of 60 mm., a width of 15 mm. and a thickness of 4 mm. In the middle of one of the large faces there is provided a U-shaped notch having a flat bottom dimensioned to have a width of 8 mm. and a depth of about ⅓ the thickness of the test specimen. The test specimens are used for testing impact strength with a Charpy type impact machine in which the test specimens are positioned on one of the 15 mm. faces on the supports with the distance between the supports being about 40 mm.

The average impact strength observed with 16 specimens at 20° C. is 3.1 kg. cm./cm.³. This is to be compared with an average impact strength of 0.6 kg. cm./cm.³ with polyvinyl chloride onto which chlorinated butyl rubber has not been grafted. Under artificial accelerated ageing in an "Atlas Weather-O'Meter" for 300 hours, the average impact strength of the graft resin remains at about 1.5 kg. cm./cm.³.

For purpose of comparison, 8 parts by weight of chlorinated butyl rubber was mixed with 92 parts by weight polyvinyl chloride resin and test specimens were prepared from this mixture in the same way as before and the mixture gave an impact strength of 1.2 kg. cm./cm.³.

The heat distortion point was observed at 68.5° C. for the grafted material as compared to a heat distortion point of 78° C. with polyvinyl chloride. The heat distortion point is measured as the temperature at which the apparent modulus of rigidity is 31.5 kg./mm.² for a parallelepiped test specimen of 100 mm. x 10 mm. x 4 mm., subjected to an applied torque in a plane perpendicular to the largest face in a Clash and Berg tester.

Example 2

The process described in Example 1 was followed with polymerization with vinyl chloride for a period of between 15 to 16 hours with various percentages of chlorinated butyl rubber in the polymer with the following results:

| Chlorinated butyl rubber in the polymer, percent | Impact strength at 20° C. (kg. cm./cm.³) | Heat distortion point (° C.) |
| --- | --- | --- |
| 0 | 0.6 | 78 |
| 4.9 | 1 | 72 |
| 6.6 | 2.2 | 67 |
| 8 | 3.1 | 65 |
| 11.1 | (¹) | 57 |

¹ 0 breaking/16 test specimens.

This table shows that the most impact strength increases with the percentage of chlorinated butyl rubber in the polymer while the heat distortion point falls off gradually but still remains in a desirable range.

Example 3

In a horizontally disposed autoclave of stainless steel, having a capacity of 500 liters and provided with an agitator, there is introduced 200 kg. of vinyl chloride, 13 kg. of chlorinated butyl rubber and 80 grams of azodiisobutyronitrile as a catalyst. After solution of the chlorinated butyl rubber in the vinyl chloride, the materials are heated for 17 hours at 64° C. under a pressure of 10 kg./cm.²—corresponding to a K-value of 60. After degasification to remove unreacted vinyl chloride, a graft polymer containing 11.3% of chlorinated butyl rubber is obtained in a yield of 50.7% based upon the weight of vinyl chloride employed. The impact strength at 20° C. of the formed graft polymer is 2.75 kg. cm./cm.³.

The same procedure was carried out with 200 kg. of vinyl chloride, 12 kg. of chlorinated butyl rubber and isopropylperoxydicarbonate in a quantity to provide 0.0015% of active oxygen based upon the weight of vinyl chloride. After 15 hours at 52° C. and under a pressure of 7.5 kg./cm.², corresponding to a K-value of 71, a graft polymer was obtained containing 10.9% chlorinated butyl rubber in a yield of 49% based upon the weight of vinyl chloride. The test specimens did not rupture in impact strength tests at 20° C.

The results of the impact strength of these two experiments show that at equal rate of graft chlorinated butyl rubber, the impact strength increases with the K-value.

Example 4

In the same apparatus as in Example 1, there is introduced 40 kg. of vinyl chloride and 2 kg. of butyl rubber. The materials are heated for one hour at 52° C. in order to dissolve the butyl rubber in the monomer and then 75 grams of azodiisobutyronitrile is added. Heating is carried out for 16 hours at 52° C. under a pressure of 7.5 kg./cm.². Unreacted vinyl chloride is removed by vaporization and a resin containing 13.3% butyl rubber is obtained in a yield of 33% based upon the weight of vinyl chloride.

A part of the obtained polymer is dissolved in tetrahydrofurane and upon addition of trans-dichloroethylene, the total polyvinyl chloride is precipitated. This is because there is only a mixture of butyl rubber with polyvinyl chloride as distinguished from a graft polymer. The impact strength of the mixture at 20° C. is 1.6 kg. cm./cm.³ which corresponds to the impact strength obtained with a graft polymer corresponds to the impact strength obtained with a graft polymer containing only 5.5% by weight of chlorinated butyl rubber.

It will be apparent from the foregoing that we have provided a method and means for producing graft polymers of vinyl chloride having improved impact strength and ageing characteristics.

It will be understood that changes may be made in the details of formulation and method of fabrication without departing from the spirit of the invention, especially as defined in the following claims.

We claim:

1. A process for the preparation of graft polymers of vinyl chloride comprising dissolving 1–30 parts by weight chlorinated butyl rubber in 99–70 parts by weight vinyl chloride monomer, polymerizing the solution in bulk whereby chlorinated butyl rubber is grafted onto the formed polymer of the vinyl chloride and in which the graft polymer contains 1–30% by weight chlorinated butyl rubber.

2. The process as claimed in claim 1 in which the polymerization is carried out in the presence of a catalyst.

3. The process as claimed in claim 2 in which the polymerization catalyst is introduced with the chlorinated butyl rubber during the solution thereof in the vinyl chloride monomer.

4. The process as claimed in claim 2 in which the polymerization catalyst is introduced after the chlorinated butyl rubber has been dissolved in the vinyl chloride monomer.

5. The process as claimed in claim 1 in which the chlorinated butyl rubber is present in the graft polymer in an amount within the range of 5–15% by weight of the graft polymer.

6. The process as claimed in claim 1 in which the chlorinated butyl rubber is present in the dissolved state in the vinyl chloride monomer prior to polymerization.

7. The process as claimed in claim 1 in which the polymerization is carried out in the presence of a catalyst selected from the group consisting of organic peroxides, organic peroxydicarbonates, and azonitriles.

8. A process for the preparation of graft polymers of vinyl chloride comprising dissolving chlorinated butyl rubber in a vinyl chloride monomer in an amount within the range of 1–30% by weight of the said graft polymers, polymerizing the solution in bulk whereby chlorinated butyl rubber is grafted onto the formed polymer of the vinyl chloride.

9. The process as claimed in claim 8 in which the chlorinated butyl rubber is present in an amount within the range of 5–15% by weight of the graft polymers to be obtained.

10. The process as claimed in claim 8 in which the polymerization reaction is carried out in the presence of a free radical polymerization catalyst.

References Cited

UNITED STATES PATENTS 3,144,426 8/1964 Burke et al. _____ 260—876
3,268,623 8/1966 Beer _____ 260—876

MURRAY TILLMAN, Primary Examiner.

G. F. LESMES, Examiner.

C. J. SECCURO, T. G. FIELD, Assistant Examiners.